Figure 1:
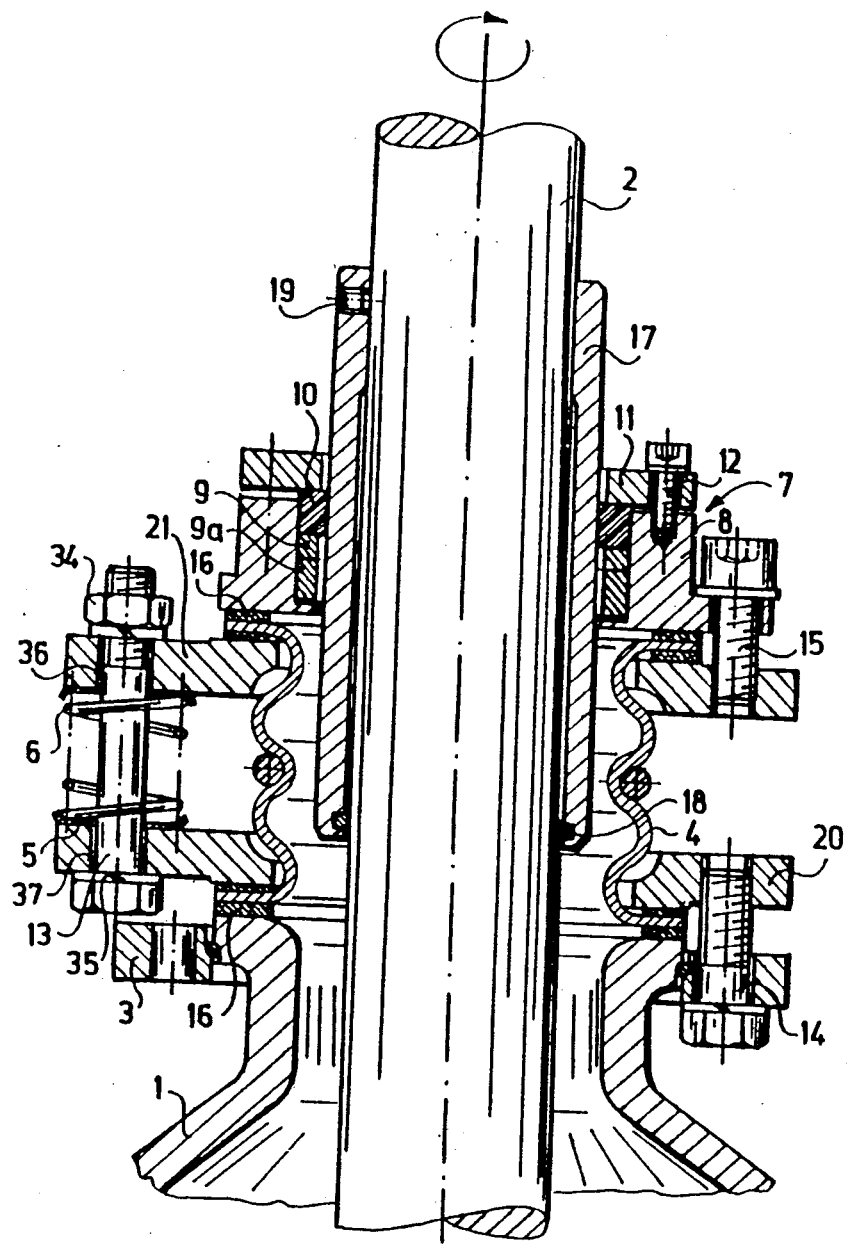

United States Patent [19]

Kovács et al.

[11] Patent Number: 5,048,847
[45] Date of Patent: Sep. 17, 1991

[54] STUFFING BOX FOR SEALING LARGE-SCALE DEFLECTION SHAFTS

[75] Inventors: Gyula Kovács, Monor; Endre Gulyás, Budapest, both of Hungary

[73] Assignee: Richter Gedeon Vegyeszeti Gyar RT, Hungary

[21] Appl. No.: 545,102

[22] Filed: Jun. 27, 1990

Related U.S. Application Data

[63] Continuation of Ser. No. 216,284, Jul. 7, 1988, abandoned.

[30] Foreign Application Priority Data

Jul. 10, 1987 [HU] Hungary ............................ 3254/87

[51] Int. Cl.⁵ .................................................. F16J 15/52
[52] U.S. Cl. ........................................ 277/2; 277/30; 277/98; 277/106; 277/200; 285/114; 285/226
[58] Field of Search ........................................ 277/4-6, 277/101, 123, 175, 187, 200, 212 FB, 2, 30, 98, 106; 285/226, 227, 114

[56] References Cited

U.S. PATENT DOCUMENTS

| | | | |
|---|---|---|---|
| 3,001,801 | 9/1961 | Downing | 285/114 X |
| 4,243,253 | 1/1981 | Rogers, Jr. | 285/114 X |
| 4,330,135 | 5/1982 | Butterfield | 277/105 X |
| 4,345,766 | 8/1982 | Turanyi | 277/30 |
| 4,443,015 | 4/1984 | Duffee et al. | 277/30 |
| 4,732,396 | 3/1988 | Brigham et al. | 285/226 X |
| 4,819,965 | 4/1989 | Press et al. | 285/114 X |
| 4,826,181 | 5/1989 | Howard | 277/112 |

FOREIGN PATENT DOCUMENTS

| | | | |
|---|---|---|---|
| 712497 | 6/1965 | Canada | 285/226 |
| 2208407 | 9/1973 | Fed. Rep. of Germany . | |
| 773375 | 10/1980 | U.S.S.R. | 285/226 |
| 1386602 | 3/1975 | United Kingdom | 277/212 FB |
| 1395789 | 5/1975 | United Kingdom | 285/227 |

OTHER PUBLICATIONS

Ing. W. Braun, Oil-Free Reciprocating Compressors with PTFE Rings, Aug. 1970, Engineering Digest (GB), vol. 31, No. 8.

Primary Examiner—Allan N. Shoap
Assistant Examiner—Scott Cummings
Attorney, Agent, or Firm—Handal & Morofsky

[57] ABSTRACT

The invention relates to a stuffing box for the sealed passage of a shaft with undesirable deflection through connecting branch, provided with a casing, a stuffing box sland containing packing rings, as well as with a tubular spring compensator, one end of which is rigidly and releasably engaged with the connecting branch, the other end with the casing of the stuffing box. At least one guide bush (10) is arranged in the casing (8) centering the stuffing box (7) to the shaft (2). This guide bush can be arranged between the packing rings (9, 9a) and over (11) of the casing, and it is made of material, suitably of bearing material with low friction coefficient. Flanges (20, 21) are arranged on each end of the compensator (4), and one flange (20) is rigidly and releasably coupled with the connecting branch (1), the other flange (21) with the stuffing box (7) suitably by screw joints (14,15), and the two flanges (20,21) are interconnected by means of screws passing through the holes of the flanges, allowing slight flexible radial and axial displacement. The flexible coupling takes up the radial deflection and the slight axial displacement of the shaft.

5 Claims, 2 Drawing Sheets

STUFFING BOX FOR SEALING LARGE-SCALE DEFLECTION SHAFTS

This application is a continuation of application Ser. No. 216,284, filed July 7, 1988, now abandoned.

The invention relates to a stuffing box for the sealed passage of large-scale deflection shafts through connecting branch, provided with a casing, a stuffing box gland with packing rings and a tubular spring compensator.

The sealed passage of heavy-duty rotating shafts through the connecting branch of a machinery is rather difficult in several machines, e.g. autoclaves, mixers, centrifuges used in the chemical industry, because the radial deflection of the shaft in these machines is fairly wide, consequently the packing elements used in the conventional stuffing boxes will break down or become displaced within a vary short time, due to the radial impact. As a result, the vessel becomes leaky at the point the shaft passes through whereupon, the material in it may flow out involving both loss of material and environment pollution. It is therefore harmful by all means, and must be eliminated.

In stuffing boxes taking up even several mm of radial deflection a tubular spring compensator is built in between the vessel's connecting branch and the casing of the stuffing box. This tubular spring compensator—owing to the flexibility—follows the deflections of the shaft, thereby protecting the packing elements from harmful loads. According to DF-OS 2 208 407, the stuffing box is fixed to the wall of the vessel or to the connecting branch by means of a flange by screws. The two ends of the stuffing box may slightly deflect in relation to the wall of the vessel or to the flange. Rollers running on the shaft retained with roller-holding brackets fixed on the flange are used for centering the stuffing box to the shaft. This stuffing box was prepared for a sugar-industrial diffusion tower, where the large diameter shaft passes through on the bottom of the machine, hence it was necessary to counterbalance the torque and the components given by the weight of the stuffing box.

On account of using rollers and roller-holding brackets to be set separately but in synchronized way, the above described solution is complicated. A further source of fault is that both the tubular spring compensator and the screws fastening the stuffing box are fixed on the vessel. The accurate spacing of about 10–12 screws around the bearing surface of the stuffing box requires extreme precision and even minimal inaccuracy may result in lack of uniaxiality. Because of the above difficulties, the stuffing box is applicable only if it is designed together with the apparatus. It can not be installed subsequently into the already existing apparatus in place of a conventional stuffing box.

The object of the present invention is to provide a stuffing box having a tubular spring compensator, for sealing a shaft passing through the wall or connecting branch of the apparatus to be sealed, which enables centering of the stuffing box to the shaft with a simple and inexpensive method. The invention is also applicable as a retro-fit to existing apparatuses.

According to the invention, one end of the compensator is rigidly and releasably joined to the connecting branch, and the other end to the casing of the stuffing box, and in essence one or several guide bushing(s) is/are arranged in the casing for centering the stuffing box with respect to the shaft. The guide bushing is arranged preferably between the packing rings and cover of the casing, and it is made of material with a low friction coefficient, suitably of bearing material, since actually it functions as sliding bearing.

A flange is preferably arranged on each end of the tubular spring compensator, and one of the flanges is rigidly and releasably engaged with the connecting branch of the vessel, and the other flange with the stuffing box, suitably by screw joint, and the two flanges are interconnected allowing minimal radial and axial flexible displacement. This flexible coupling allowing axial displacement can be realized by having the two flanges of the compensator interconnected by means of screws passing through the holes of the flanges, on the ends of which a fixed stop, e.g. threaded nut is arranged, and they are passing through coil springs stressed between the flanges.

In an embodiment of the invention which is especially suitable for sealing of a shaft passing through the connecting branch of pressuretight vessel -, a prestressed tubular spring is arranged between the flanges at the ends of the tubular spring compensator determining a sealed safety space surrounding the compensator. In this case flexibility of the connection is ensured by the tubular spring. In this embodiment, the safety space may be interconnected with instrument(s) sensing and/or indicating the pressure rise in the space, e.g. a manometer and a compensating pipe end.

Figure 2:
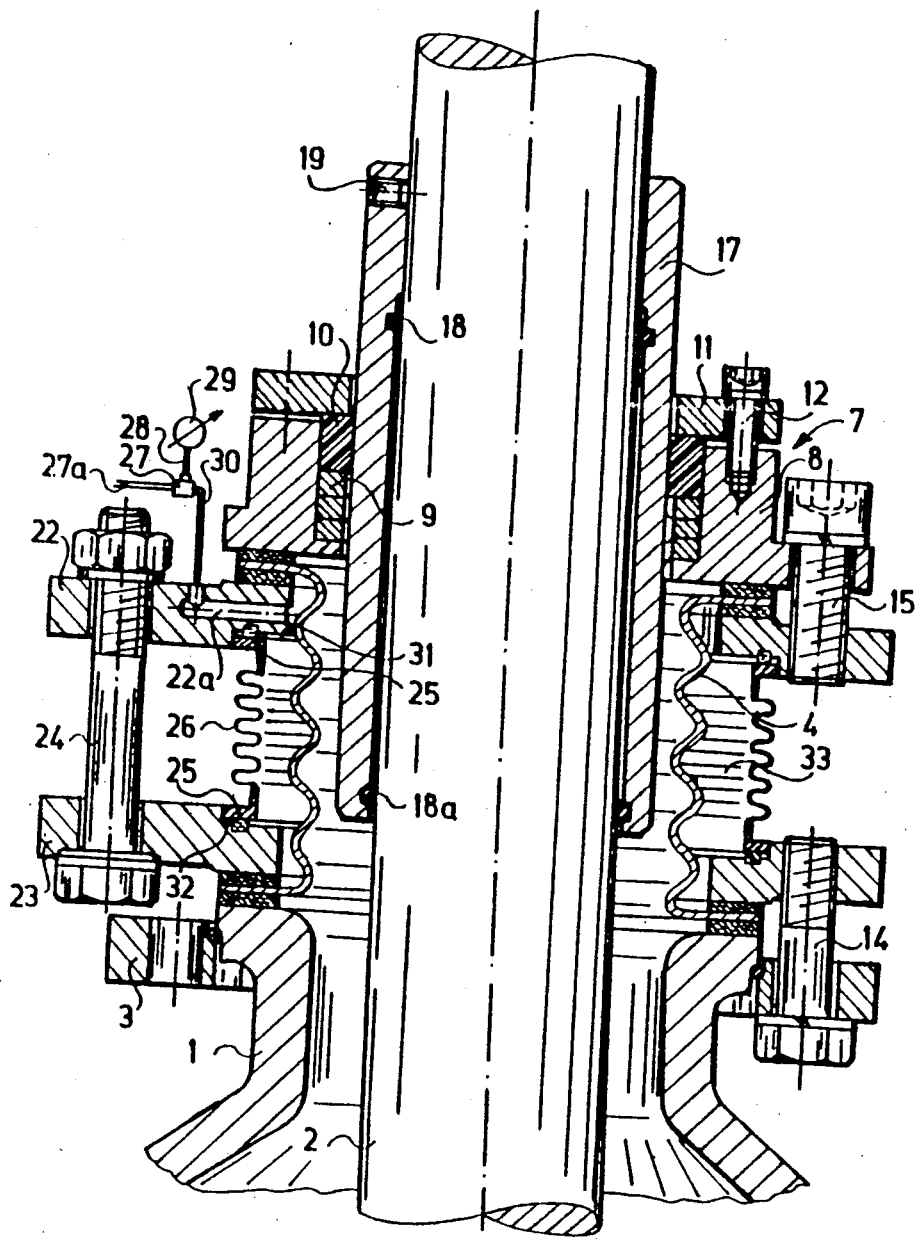

The invention is described in detail by way of examples, with the aid of drawings, in which:

FIG. 1 is a longitudinal section of the shaft sealing according to the invention, FIG. 2 is an alternative method of shaft sealing provided with improved pressure protection.

The connecting branch of the chemical-industrial machinery, i.e. autoclave, mixer, or centrifuge, is marked with reference number 1 and its shaft with 2. One end of the tubular spring compensator marked 4 is fixed to the connecting branch 1 by any suitable releasable joint, while the other end of compensator 4 is connected with stuffing box 7 similarly with releasable joint. The stuffing box 7 is mounted on abrasive sleeve 17 fastened to and rotating together with shaft 2, serving partly for the surface protection of the shaft, and partly for elimination of incidental surface faults of the shaft.

The stuffing box 7 consists of casing 8 and packing rings 9 and 9a arranged in it. Packing rings 9 serves for sealing against internal overpressure, and 9a against external pressure (e.g. in case of internal vacuum). A guide bushing 10 is rigidly mounted above the packing rings 9 and 9a, made of well-sliding bearing material, e.g. carbon-filed polytetreafluorethylene, and the matching inside diameter of which concurs with the matching diameter of packing rings 9, 9a. More than one, e.g. two guide bushings may be used, when the second guide bushing can be placed between the packing rings 9 and 9a, or the two guide bushings may surround the packing rings, or even more than two packing rings, when the guide bushings and packing rings can be alternately mounted. The guide bushing 10 functions on the abrasive sleeve 17 as sliding bearing, centering the stuffing box 7 to the abrasive sleeve 17. The abrasive sleeve 17 is fixed to shaft 2 with retaining screws 19 and sealed at least with one packing ring 18. Casing 8 of the stuffing box is closed with cover 11 fixed to the casing 8 by way of screw joint 12. The tubular spring compensator 4 between the casing 8 and flange 3 of the connecting branch 1 is mounted as follows: flange 20 fixed with screw joint 14, seated on flange 3 through the insertion of packing 16, clamps one end of the compensator 4, while the other end is claimed with flange 21 fixed to the casing 8 by means of screw joint 15 with the insertion of packing 16. Holes 36 and 37 are on the circumference of flanges 20 and 21, screw 13 passing through each. Threaded nut 34 is fixed at the end of screw 13 and outside the flange 21, and spring washer 35 is fixed between flange 20, threaded nut 34 and flange 21. Screw 13 between flanges 20 and 21 is passing through coil spring 6 seated on spring cups 5, which forces apart the flanges 20 and 21.

In the version shown in FIG. 2 the most significant difference between this version and the one shown in FIG. 1 is that because of the pressure prevailing in this chemical-industrial apparatus, an arrangement offering additional safety is used for incidental fault of the compensator 4. Here the tubular spring compensator 4 is clamped partly between causing 8 of the stuffing box and flange 22, and partly between flange 3 in the connecting branch 1 and flange 23. A prestressed tubular spring 26 is arranged between flanges 22 and 23 supported in recess 31 machined in flange 22 and in recess 32 machined in flange 23 with the insertion of packing rings 25. A compensating hole 22a is in flange 22 connected with compensating pipe 30. Manometer 29 is installed through ball valve 27 and pulse line 28 into the compensating pipe 30. Finally the compensating pipe end 27a is leading out of ball valve 27. The coil spring 6 shown in FIG. 1 can be dispensed with from pin 24 (corresponding to pin 13 in FIG. 1) interconnecting the flanges 22 and 23, because in this embodiment the prestressed tubular spring 26 ensures the flexibility of the connection, as well as the safety. The mechanism according to the invention functions as follows:

Upon rotation of the shaft 2, the abrasive sleeve 17 rigidly connected to it by screws 19 rotates together with the shaft even in case of radial deflection. The stuffing box 7 is fixed by screw joint 15, flanges 21 and 20 and screw joint 14 to flange 3 of the connecting branch 1. The axial and radial displacements of the two ends of compensator 4, i.e. the connecting branch 1 and stuffing box 7 in relation to each other against the coil spring 6 are made possible by screw 13 interconnecting the flanges 20 and 21, at the same time preventing the stuffing box 7 from considerable torsional deflection in relation to the connecting branch 1. The radial deflection and slight axial displacement of shaft 2 between flanges 20 and 21 are taken up by the flexible connection ensures by screw 13 and spring 6. Since the compensator 4 allows slight flexible displacement between the flange 3 and casing 8 of the stuffing box, at the same time the guide bushing aligns and tightly clamps the abrasive sleeve 17, the deflection of casing 8 of stuffing box it concentric with the shaft 2, thus load due to radial deflection of the shaft does not affect the packing rings 9, 9a. The 2-3 mm radial deflection frequently occurring in the practice is considerably reduced below 0.1 mm by this flexible bed, whereby the frequency and cost of maintenance—due to knocking out the packing—are significantly reduced, while the operation safety of the apparatus is greatly improved, the version shown in FIG. 2 is preferably used for chemical-industrial machinery operating under pressure. In respect of reducing the radial impact, operation of this mechanism is actually identical with the one presented in FIG. 1, with the difference that here the radial deflection and slight axial displacement of the shaft are taken up by the tubular spring 26. Furthermore, if the compensator 4 cracks upon the effect of the pressure prevailing in the vessel, i.e. it would be no longer pressuretight, its role ensuring the pressure tightness and flexible bed is taken over temporarily by the tubular spring 26. At the same time, the pressure medium passes through compensating hole 27a, compensating pipe 30 and ball valve 27 into the manometer 29, which indicates the pressure rise in the space within the tubular spring, furthermore such conventional device can be connected with the compensating pipeend 27a, which, for example a sound signal calls the attention of the handling crew to the fault that has occurred. In case of suitably high flow velocity, the ball valve 27 closed and stops the gas outflow through the compensating pipe-end 27a. The prestressed tubular spring 26 that rests in sealed condition on flanges 22 and 23 performs its duty until the apparatus is stopped, decompressed and the fault is repaired.

The main advantage of the present invention is that the centering between the shaft and stuffing box is very simply achieved by the guide bushing and at the same time the radial load is reduced due to the shaft deflection. The guide bushing takes over the radial movement of the shaft, taking along the casing of the stuffing box. The guide bush can be manufactured simply at a low cost by machining in serial production according to the required precision, and it can be placed into the casing of the stuffing box in a simple manner. The uniaxiality of the packing rings and guide bushing—because of the identical matching diameters—can be definitely guaranteed. Any packing ring used so far can be built into the stuffing box, special quality is not required, simple and inexpensive packing elements can be used, because the mechanism according to the invention ensures tolerant load and therefore long life. The invention allows mounting of the stuffing box either to the upper or the lower shaft outlet. Assembly of the mechanism does not demand any special skill, or precision, and it can be installed into existing machines simply by replacement of the earlier stuffing box.

What is claims is:

1. A box construction for sealing a rotating shaft extending through a wall of a vessel, said construction comprising a stuffing box surrounding said shaft, a tubular compensator for accommodating axial and radial displacement of said shaft, said compensator having two ends, one end of said compensator being sealingly connected to said stuffing box and the other end sealingly connected to said wall of said vessel, wherein the ends of said compensator are held in connection by separate annular flanges, one of said flanges being connected rigidly and releasably to said vessel and the other of said flanges being connected rigidly and releasably to said stuffing box, said flanges being interconnected by means of bolts passing through peripheral holes of said flanges, said bolts having fixed stops at their outer ends, and a prestressed spring member being arranged between said flanges.

2. A stuffing box construction as claimed in claim 1, wherein said prestressed spring member comprises coil springs surrounding said bolts.

3. A stuffing box construction as claimed in claim 1, wherein said prestressed spring member comprises a tubular spring surrounding said compensator.

4. A stuffing box as claimed in claim 3, particularly for the sealing of a shaft passing through the connecting branch of a pressure-tight vessel, wherein said prestressed tubular spring is arranged between the flanges on the ends of the compensator, determining the sealed safety space surround the compensator.

5. A stuffing box as claimed in claim 4, wherein said safety space is interconnected with instrument(s) sensing and indicating the pressure rise in the safety space.

* * * * *